(12) United States Patent  
Cottrell et al.

(10) Patent No.: US 7,874,612 B2
(45) Date of Patent: Jan. 25, 2011

(54) VEHICLE MOUNTED PRINTER STATION

(75) Inventors: William D. Cottrell, Hope Mills, NC (US); Kenneth B. Wiseman, Jr., Dunn, NC (US)

(73) Assignee: LEM Solutions, LLC, Greensboro, NC (US)

( * ) Notice: Subject to any disclaimer, the term of this patent is extended or adjusted under 35 U.S.C. 154(b) by 0 days.

(21) Appl. No.: 12/653,064

(22) Filed: Dec. 8, 2009

(65) Prior Publication Data

US 2010/0090508 A1    Apr. 15, 2010

Related U.S. Application Data

(63) Continuation of application No. 12/322,381, filed on Feb. 2, 2009, now Pat. No. 7,637,566, which is a continuation of application No. 10/750,698, filed on Jan. 2, 2004, now abandoned.

(51) Int. Cl.
*A47C 17/00* (2006.01)
*A47C 31/00* (2006.01)

(52) U.S. Cl. .................. 297/129; 297/217.3; 297/463.2

(58) Field of Classification Search .................. 297/129, 297/391, 217.3, 463.2
See application file for complete search history.

(56) References Cited

U.S. PATENT DOCUMENTS

| | | | |
|---|---|---|---|
| 3,019,050 A | | 1/1962 | Spielman |
| 3,449,011 A | | 6/1969 | Edwards et al. |
| 3,512,605 A | | 5/1970 | McCorkle |
| 3,752,376 A | * | 8/1973 | Shelton et al. .............. 224/275 |
| 4,490,842 A | | 12/1984 | Watanabe |
| 4,818,010 A | | 4/1989 | Dillon |
| 4,858,994 A | | 8/1989 | Yamashita |
| 5,347,115 A | | 9/1994 | Sherman et al. |
| 5,507,556 A | | 4/1996 | Dixon |
| 5,629,833 A | * | 5/1997 | Ido et al. ............... 361/679.27 |
| 5,640,297 A | | 6/1997 | Labaze |
| 5,669,668 A | | 9/1997 | Leuchtmann |
| 5,713,633 A | | 2/1998 | Lu |
| 5,751,548 A | | 5/1998 | Hall et al. |
| 5,779,305 A | | 7/1998 | Hocking |
| 5,835,127 A | | 11/1998 | Booth et al. |
| 6,022,078 A | | 2/2000 | Chang |
| 6,059,358 A | | 5/2000 | Demick et al. |
| 6,092,705 A | | 7/2000 | Meritt |
| 6,199,948 B1 | | 3/2001 | Bush et al. |
| 6,394,551 B1 | | 5/2002 | Beukema |
| 6,411,874 B2 | | 6/2002 | Morgan et al. |
| 6,445,408 B1 | * | 9/2002 | Watkins ...................... 348/148 |
| 6,601,914 B1 | * | 8/2003 | Seastrom ............... 297/188.06 |
| 6,604,786 B1 | * | 8/2003 | Benden et al. ......... 297/188.06 |
| 6,669,285 B1 | | 12/2003 | Park et al. |
| 6,698,832 B2 | | 3/2004 | Boudinot |

(Continued)

*Primary Examiner*—David Dunn
*Assistant Examiner*—David E Allred
(74) *Attorney, Agent, or Firm*—Schwartz Law Firm, P.C.

(57) ABSTRACT

A vehicle mounted printer station is made up of a printer secured to a support surface tray that includes an adapter capable of attaching the tray and printer to the top of a vehicle seat. The support surface is preferably a rectangular shaped plate with front, back and side edges along with top and bottom surfaces. The bottom surface is attached to the adapter, the adapter includes at least one attachment rod for securing the support surface to the vehicle seat. The attachment rods are sized to be received into receptacles provided in the top of a vehicle seat designed for the vehicle headrest.

20 Claims, 5 Drawing Sheets

U.S. PATENT DOCUMENTS

| | | |
|---|---|---|
| 6,883,870 B2 | 4/2005 | Jost |
| 7,070,237 B2 | 7/2006 | Rochel |
| 2002/0079732 A1 | 6/2002 | Saberan et al. |
| 2003/0234550 A1 | 12/2003 | Brooks et al. |
| 2005/0012375 A1 | 1/2005 | Giasson |

* cited by examiner

VEHICLE MOUNTED PRINTER STATION

BACKGROUND OF THE INVENTION

The present invention relates to a mobile office environment for a vehicle. In particular, the invention is a printer station for a motor vehicle. Applicant anticipates that the invention could be useful particularly with police cars and other public safety vehicles but understands it may be used in other vehicles such as military vehicles, and other vehicles needing a printer station, such as vehicles utilized by insurance companies. Motor vehicles adapted for use by law enforcement and public safety officers are commonly outfitted with the latest electronic technologies such as digital video cameras, notebook computers, printers, facsimile machines, mobile data terminals and digital scanners. All the while, this new equipment must share cabin space with traditional add-on equipment such as radios, sirens and lights.

Safety and practical issues further complicate the arrangement of the new devices within the motor vehicle cabin. For example, any equipment added to the cabin must be positioned such that safety devices such as airbags and seat belts continue to function as intended. Moreover, any new equipment added to a motor vehicle cabin must be securely mounted to the vehicle to prevent damage to the vehicle, its occupants and the equipment itself during ingress and egress of passengers, acceleration, or sudden turns or stops. In most currently-intended uses of the invention, the equipment must be accessible to the user. Mounting systems which place the printer in the trunk or back seat are impractical and not desired.

The invention is specifically related to a printer, which is one of the most recent types of equipment to be added primarily to law enforcement and public safety vehicles. Most law enforcement or public safety vehicles need printers to make more effective and efficient use of mobile data terminals or laptop/notebook computers in the vehicle. It should be understood that modern printers often serve more than one function. For example, modern printers have multiple functions in addition to the printing function, including scanning, faxing and photocopying. Therefore, for the purpose of this invention the term "printer" includes any peripheral device that can be used as a printer, even if it has additional functions.

Printers are cumbersome devices to safely and unobtrusively mount within the passenger compartment of a motor vehicle. The prior art has attempted to mediate this problem by mounting printers to pedestals secured to the vehicle's floorboard or to brackets connected to the dashboard. However, pedestal mounted printers take up much of the space needed for other pedestal mounted devices. Dashboard mounted printers interfere with space needed for other equipment and, potentially, with the driver's field of vision. What is needed is a vehicle printer station for securely, safely and unobtrusively mounting a printer within a motor vehicle so that it is accessible to the user.

SUMMARY OF THE INVENTION

The present invention is directed towards enhancing the mobile office environment of a motor vehicle. The invention is particularly useful in eliminating the obtrusiveness of a printer used within the cabin space of a motor vehicle.

Generally, the present invention is a vehicle mounted printer station made up of a printer and an adapter for mounting the printer to the top of a vehicle seat. The preferred method is to utilize a support surface adapted to receive the printer. The support surface can preferably be a tray or plate, which may be separate from or integral with the printer. The support surface, if integral with the printer, can be the bottom surface of the printer itself. The support surface is, therefore, preferably a rectangular shaped plate with front, back and side edges along with top and bottom surfaces. The walls may be sized to conform to the printer. The rear wall is preferably non-continuous so that power and other cables may be attached to the printer. The front wall is preferably reduced in height to allow paper to exit the printer.

The printer station is connected to the top of the vehicle seat by rods that are received in receptacles on the top of the seat. The rods are the adapter for connecting the printer to the seat. These receptacles are standard receptacles designed to receive rods from the manufacturer's standard headrest. The adapter contains one or more mounting rods which attach to the seat through use of the headrest mounting receptacles. The adapter can, therefore, utilize the posts of the headrest itself, or the printer station can have posts which replace the headrest posts. Therefore, in one embodiment, the headrest remains attached to the seat while in the other embodiment the headrest must be removed. It is preferred that at least one and preferably two extra mounting rods are supplied with the adapter for the purpose of securing the support surface to the top of the vehicle seat in place of a detachable headrest. The adapter is removably attached to the seat in a fashion typical of mounting the headrest to the vehicle seat.

In a preferred embodiment, the vehicle mounted printer station comprises a printer, an adapter having at least one post for connecting to a vehicle seat, and a support surface connecting the adapter printer vehicle. In a preferred embodiment the detachable headrest is removed from the vehicle passenger seat whenever the printer station is secured to the top of the seat by extra mounting rods in the adapter. Each of the mounting rods is sized such that a rod receptacle in the seat frictionally receives them. The preferred shape for the mounting rods is an inverted L-shape having a support surface attaching section and a relatively longer receptacle engaging section. It is understood that rods of other configurations can be used for attaching the printer to the mounting rod receptacles of the seat.

In a preferred embodiment, the support surface includes at least one attachment member for attaching one or more of the mounting rods to the tray. Preferably, the tray attaching section of the mounting rods are pivotally attachable to the tray attachment member(s) such that the mounting rods can pivot in a vertical plane so that the rods can pivot against the bottom surface of the tray for storage and shipping. The mounting rods are extended downwardly from the attachment member(s) and are perpendicular to the tray bottom surface whenever the mounting rods are deployed to engage the vehicle seat mounting rod receptacles. Moreover, the mounting rods can detach from the tray attachment members for separate shipment and storage. The rods may preferably be adjustable so that the horizontal distance between the rods can be modified to conform to different seat configurations.

In a preferred embodiment, the printer is secured to a support surface. It is preferred that one or more strips of hook and loop fastener are adhered to the top surface of the support surface for securing a printer having a bottom surface that includes at least one adhered strip of hook and loop fastener. The printer is secured to the support surface once the hook and loop fastener of the printer fully engages the hook and loop fastener of the support surface. However, due to lateral forces encountered by the printer during vehicle acceleration, it is preferred that the printer tray includes upright sidewalls attached to its front, back and side edges to help secure the printer within the tray. Alternately, straps or adhesive strips could be used to attach the printer to the support surface. The straps could use fasteners such as buckles and/or hook and loop fasteners to hold the printer to the support surface. Moreover, it is preferred that dimensions of the support surface be sized to snugly receive the printer. Other securing methods could be utilized to ensure the support surface and printer remain attached to each other in the intended environment of use. It is also understood that the tray could be integrally formed with the printer itself. In this embodiment, the adapter could be secured to the bottom surface of the printer through the disclosed methods. The support surface may have additional attributes, such as a structure for holding a standard paper roll for feeding into the printer.

The support surface may be made from a variety of materials including but not limited to sheet metal, molded plastics and composite materials such as fiberglass and carbon fiber. The mounting rods of the adapter may be made from metals such as aluminum and steel or can be made from strong plastics such as ABS plastic.

The adapter's post may be secured to the support surface by one or more pipe clamps or pipe straps for connecting one or more mounting rods to the support surface. In this case, the mounting rods are clamped or strapped to the bottom surface of the support surface by the clamps and straps, which in turn are fastened to the support surface with screws. The support surface attachment means could also be a threaded receptacle into which a threaded portion of the mounting rod could be secured. Other conventional means of attaching the rods to the support surface are equally within the scope of this invention.

It is preferred that the distance (space) between the mounting rods be adjustable. The invention is designed to fit a variety of vehicle seats, and in cases where the vehicle seat headrest uses more than one post, the distance between the posts may vary from vehicle to vehicle. In order to allow the invention to be suited to these differing site conditions, the posts must be capable of adjusting to fit the appropriate distance, while also allowing for secure attachment once the adjustment is made. This adjustment can be done by a variety of conventional methods, including a plurality of predetermined attachment locations on the underside of the support surface or printer. In addition, the attachment location may be at least one slot in the support surface or printer through which conventional fasteners would be placed, to allow the support rods to be adjusted.

In an alternate embodiment, the posts can be adjusted by using an elongated bar having a plurality of apertures for receiving one end of the mounting posts. The elongated bar is preferably integrally attached to the support surface and extends downwardly from and perpendicularly to the bottom of the support surface. The mounting rods can be secured in the apertures of the elongated bar in a number of standard methods. The posts can be moved into different apertures so that the posts will be received in the apertures of the vehicle seat.

In operation of the preferred embodiment the detachable headrest is removed from the top of the passenger vehicle seat and stored in another location such as the trunk of the vehicle. The mounting posts of the adapter are extended downwardly from the support surface. The mounting posts are then pushed into the mounting rod receptacles of the passenger vehicle seat until the support surface rests against the top of the vehicle seat. Next, the printer is attached to the support surface and secured as disclosed above. At this point, the printer power and communication cables are connected to the printer and the printer is ready for use. Preferably the driver would have easy access to the printer, and the printer would not interfere with access to equipment behind the passenger seat or a cage between the front and back seats.

DETAILED DESCRIPTION OF THE PREFERRED EMBODIMENT

In the following description it is to be understood that descriptive terms and the like are words of convenience and are not to be construed as limiting terms. It is also to be understood that the illustrations are for the purpose of describing preferred embodiments of the invention and are not intended to limit the invention thereto.

Figure 1:
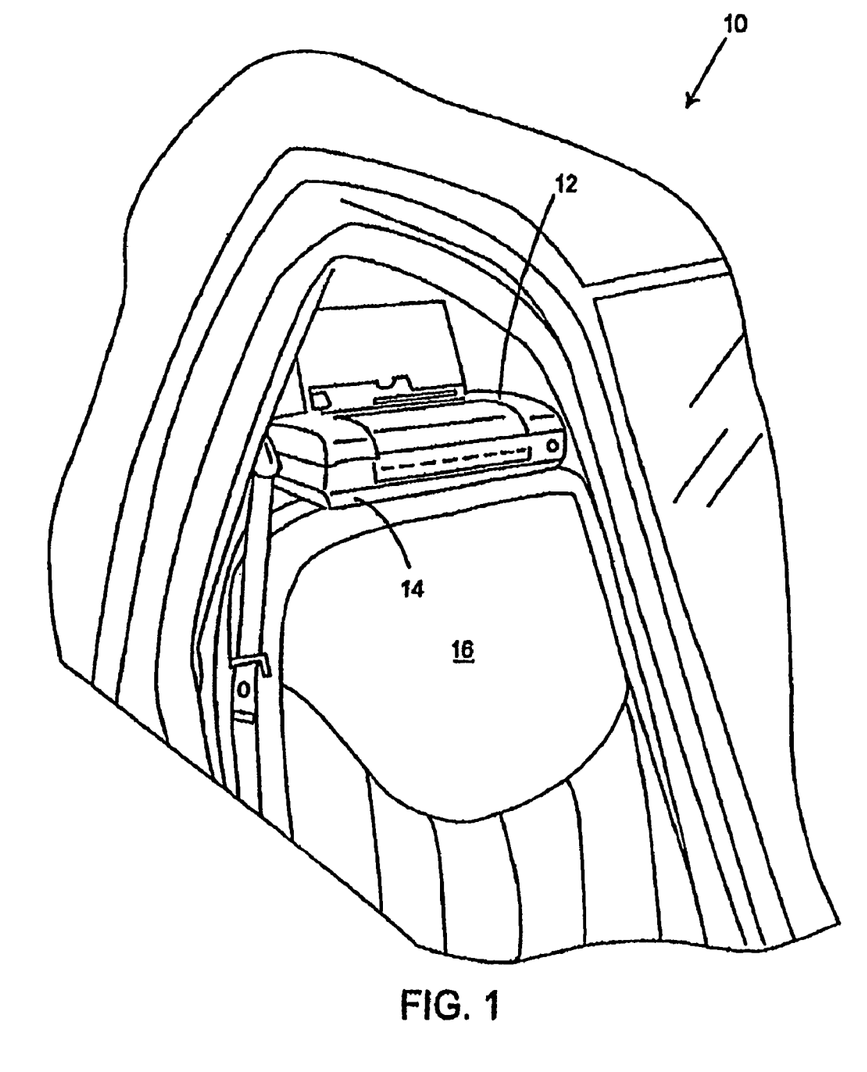
FIG. 1 is a perspective view of the present invention as seen from outside a vehicle looking in through the passenger side window.
Figure 2:
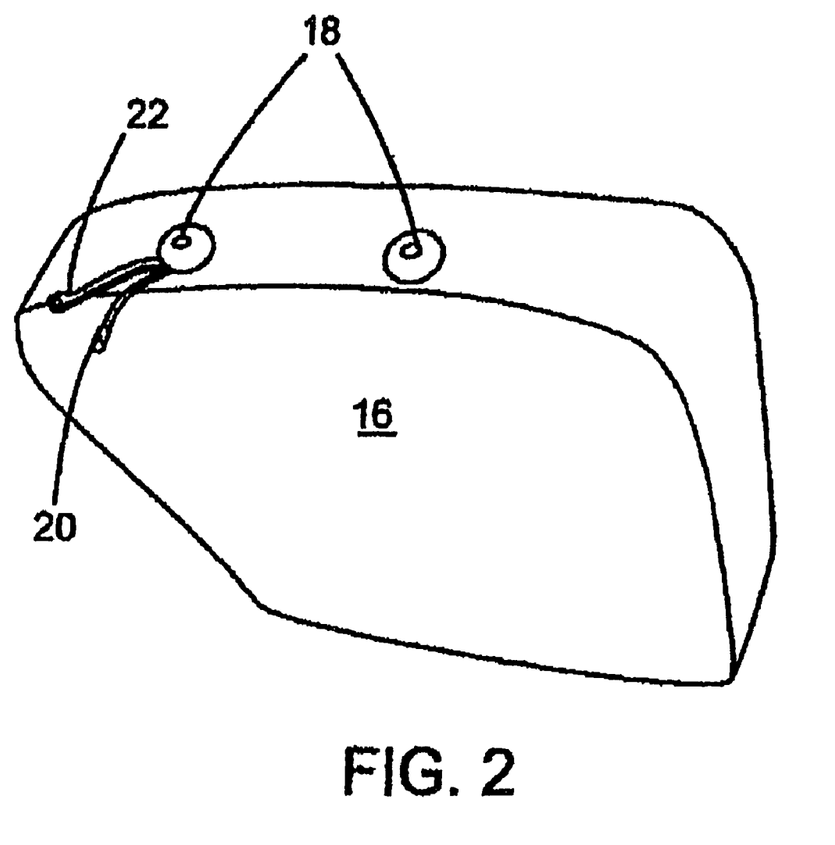
FIG. 2 is a perspective view of the vehicle seat looking down at the top and backside of the vehicle seat.

FIG. 1 illustrates a vehicle mounted printer station, generally made up of a printer 12, secured to support surface 14 that include a means for attaching support surface 14 to the top of a vehicle seat 16. As shown in FIG. 2, vehicle passenger seat 16 includes mounting rod receptacles 18. Also shown in FIG. 2, are a printer power cord 20 and a printer communication cable 22. Both are shown routed underneath the upholstery of seat 16 and exit the top of seat 16 near one of the receptacles 18.

Figure 3:
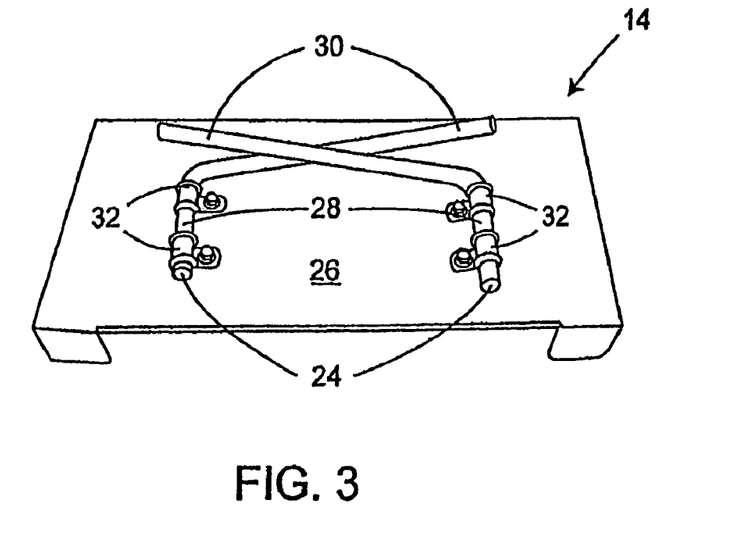
FIG. 3 is a perspective view of a preferred embodiment showing the underside of the printer station with its mounting rods folded for shipping.
Figure 4:
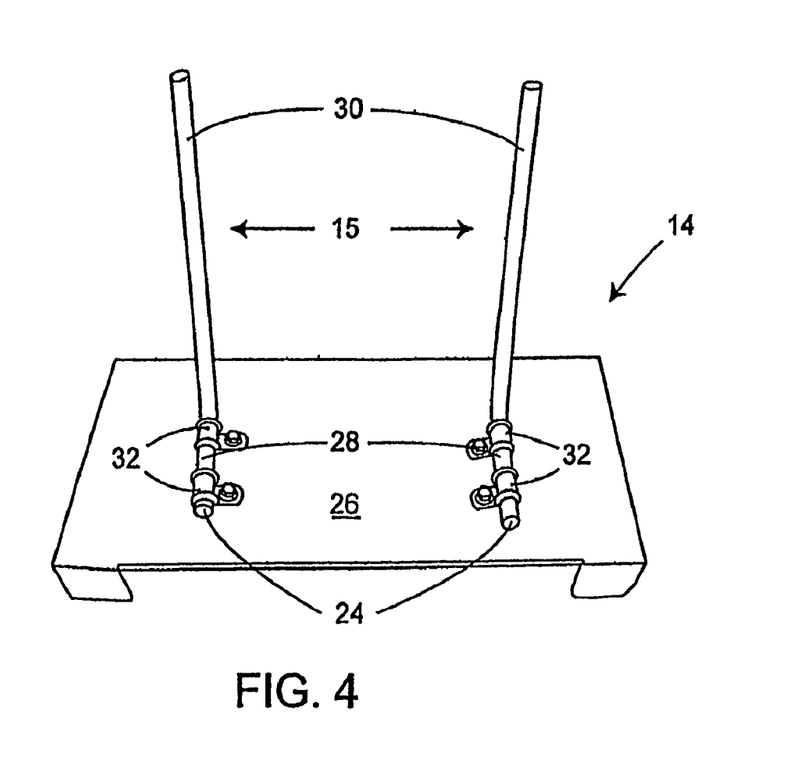
FIG. 4 is a perspective view of a preferred embodiment showing the underside of the printer station with its mounting rods extended.

FIGS. 3 and 4 both show support surface 14 turned upside down, connected to an adapter 15. The adapter 15 includes two mounting rods 24 shown attached to a bottom surface 26 of support surface 14. Both of mounting rods 24 have an inverted L-shape, including an attaching section 28 and a relatively longer receptacle engaging section 30. Mounting rods 24 are attached to bottom surface 26 by a set of pipe clamps 32, which serve as the support surface attachment means in this preferred embodiment. FIG. 3 shows mounting rods 24 folded against bottom surface 26 for easy storage and shipping. FIG. 4 shows mounting rods 24 extending away from and perpendicular to bottom surface 26. When turned upright, rods 24 extend downwardly.

Figure 5:
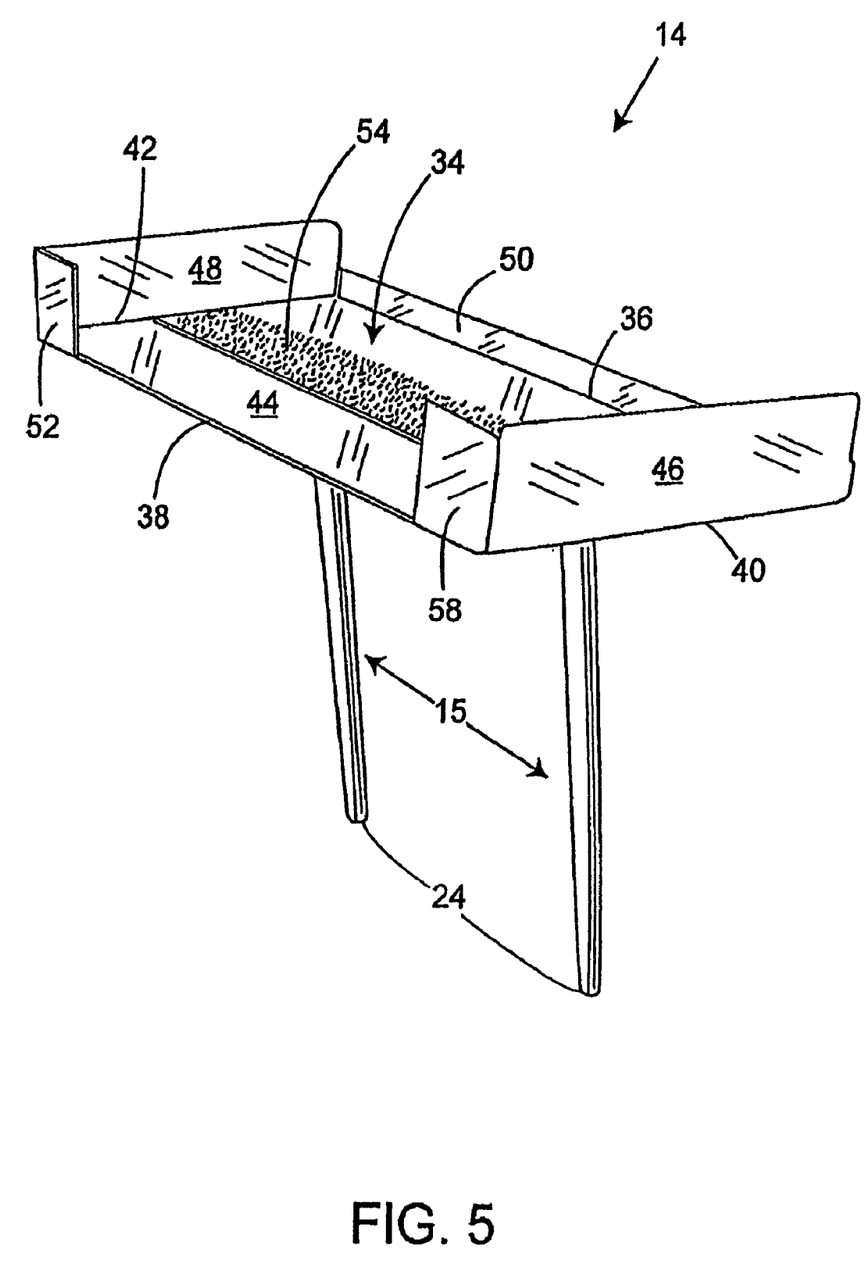
FIG. 5 is a perspective view of a preferred embodiment showing the topside of the printer station.

FIG. 5 shows a topside perspective view of support surface 14 with adapter 15 including mounting rods 24 extending downwardly. As best seen in FIG. 5, support surface 14 is made up of a rectangular shaped plate 34 having a front edge 36, a back edge 38 and side edges 40 and 42 including a top surface 44. Upright sidewalls 46 and 48 are attached to side edges 40 and 42 respectively. A low height front wall 50 is attached to tray front edge 36. An upright back wall 58 is attached to a short length of back edge 38 near wall 46. Another upright back wall 52 is attached to a short length of back edge 38 near wall 48. A rectangular strip of hook and loop fastener 54 is adhered to top surface 44. The hook and loop fastener 54 is commonly known as VELCRO™.

Figure 6:
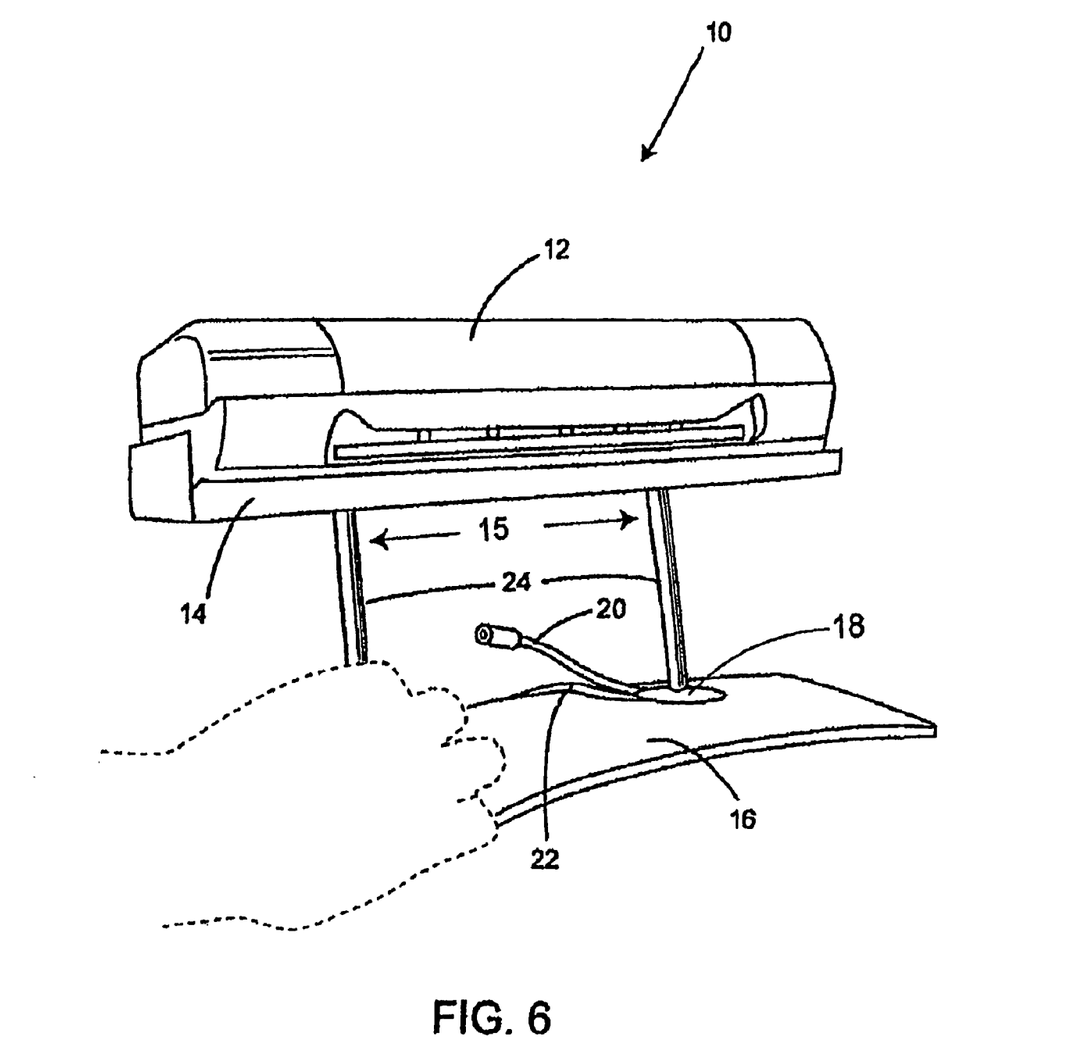
FIG. 6 is a perspective view of a preferred embodiment showing a printer being secured to the top of a seat in accordance to the present invention.

FIG. 6 shows support surface 14 including printer 12 being secured to the top of seat 16. An individual's hand, shown in dashed lines, is guiding rods 24 of adapter 15 into mounting receptacles 18 of seat 16. Once support surface 14 is resting fully upon seat 16, power cord 20 and communication cable 22 can be plugged into printer 12. At this point printer 12 is ready for use.

It will be apparent to one skilled in the art that many modifications and variations can be made to the present invention without departing from its spirit and scope. For example, the adapter can be attached to the support surface by clamps for clamping the support surface to the posts of a headrest that remains attached to the vehicle seat at all times. In this case, the printer support surface would extend from the top of the vehicle seat and the attached headrest would be used as normal. In addition, it might be preferable to orient the support surface so that it is angled toward the driver. Therefore, the invention is not to be limited by the description of the preferred embodiment but is to be limited only by the scope of the following claims.

We claim:

1. In combination with a front passenger seat of a motor vehicle, the front passenger seat defining at least one headrest mounting rod receptacle, a printer station comprising:
    a station adapter comprising a printer support structure and at least one elongated mounting rod connected to a bottom of the printer support structure, the elongate mounting rod received within the headrest mounting rod receptacle of said front passenger seat;
    a printer located within said printer support structure in a forward-facing condition, and said printer support structure comprising a plurality of walls surrounding said printer and defining an unobstructed paper discharge space for discharging printed paper forwardly into a front interior cabin space of the motor vehicle, whereby said printer resides directly vertically adjacent a top of the front passenger seat, thereby minimizing obtrusiveness of the printer station within the front interior cabin space of the motor vehicle wherein the printer support structure comprises a support surface that is elongate in a lateral direction generally perpendicular to a direction of travel of the motor vehicle, the support surface being generally horizontal, the plurality of walls comprises a first upstanding lateral wall at a first end of the support surface, a second upstanding lateral wall at a second end of the support surface, a front wall on a front side of the support surface, and a rear wall on a rear side of the support surface, wherein the first lateral wall, the second lateral wall, the front wall, and the rear wall are configured to secure the printer against lateral, fore, and aft forces experienced in the vehicle; and
    wherein at least a portion of the front wall extends to a lower height than a height of the first lateral wall and a height of a second lateral wall, the portion at least partially defining the unobstructed paper discharge space.

2. A combination according to claim 1, wherein said printer support structure covers substantially the entire top of said front passenger seat.

3. A combination according to claim 1, wherein said elongated mounting rod is pivotably attached to said printer support structure, and is movable between a folded stowed position and an extended deployed position.

4. A combination according to claim 1, wherein said printer support structure comprises a first fastener adapted for releasably attaching to a complementary second fastener secured to said printer.

5. A combination according to claim 4, wherein said first and second fasteners comprise complementary hook and loop fasteners.

6. A combination according to claim 1, and comprising at least one electrical cable routed adjacent said front passenger seat, and having a terminal end extending from said passenger seat proximate said headrest mounting rod receptacle.

7. A combination according to claim 1, wherein said printer resides vertically adjacent the top of said front passenger seat entirely separate and independent of a padded vehicle headrest.

8. A combination according to claim 1, wherein said printer support structure comprises a printer tray.

9. A printer station adapted for mounting on a front passenger seat of a motor vehicle, the front passenger seat defining at least one headrest mounting rod receptacle, said printer station comprising:
    a station adapter comprising a printer support structure and at least one elongated mounting rod connected to a bottom of the printer support structure, the elongate mounting rod adapted for being received within the headrest mounting rod receptacle of the front passenger seat;
    a printer located within said printer support structure in a forward-facing condition, and said printer support structure comprising a plurality of walls surrounding said printer and defining an unobstructed paper discharge space for discharging printed paper forwardly into a front interior cabin space of the motor vehicle, whereby said printer resides directly vertically adjacent a top of the front passenger seat, thereby minimizing obtrusiveness of the printer station within the front interior cabin space of the motor vehicle wherein the printer support structure comprises a support surface that is elongate in a lateral direction generally perpendicular to a direction of travel of the motor vehicle, the support surface being generally horizontal, the plurality of walls comprises a first upstanding lateral wall at a first end of the support surface, a second upstanding lateral wall at a second end of the support surface, a front wall on a front side of the support surface, and a rear wall on a rear side of the support surface, wherein the first lateral wall, the second lateral wall, the front wall, and the rear wall are configured to secure the printer against lateral, fore, and aft forces experienced in the vehicle; and
    wherein at least a portion of the front wall extends to a lower height than a height of the first lateral wall and a height of a second lateral wall, the portion at least partially defining the unobstructed paper discharge space.

10. A printer station according to claim 9, wherein said printer support structure is designed to cover substantially the entire top of the front passenger seat.

11. A printer station according to claim 9, wherein said elongated mounting rod is pivotably attached to said printer support structure, and is movable between a folded stowed position and an extended deployed position.

12. A printer station according to claim 9, wherein said printer support structure comprises a first fastener adapted for releasably attaching to a complementary second fastener secured to said printer.

13. A printer station according to claim 12, wherein said first and second fasteners comprise complementary hook and loop fasteners.

14. A printer station according to claim 9, and comprising at least one electrical cable attached to said printer and adapted for routing adjacent the front passenger seat.

15. A printer station according to claim 9, wherein said printer is adapted to reside vertically adjacent the top of the front passenger seat entirely separate and independent of a padded vehicle headrest.

16. A printer station according to claim 9, wherein said printer support structure comprises a printer tray.

17. A printer station adapted for mounting on a front passenger seat of a motor vehicle, the front passenger seat defining at least one headrest mounting rod receptacle, said printer station comprising:
- a station adapter comprising a printer support structure and at least one elongated mounting rod connected to a bottom of the printer support structure, the elongate mounting rod adapted for being received within the headrest mounting rod receptacle of the front passenger seat; and
- a printer located within said printer support structure, and said printer support structure comprising a plurality of walls surrounding said printer and defining an unobstructed paper discharge space for discharging printed paper into an interior cabin space of the motor vehicle, whereby said printer resides adjacent a top of the front passenger seat, thereby minimizing obtrusiveness of the printer station within the interior cabin space of the motor vehicle wherein the printer support structure comprises a support surface that is elongate in a lateral direction generally perpendicular to a direction of travel of the motor vehicle, the support surface being generally horizontal, the plurality of walls comprises a first upstanding lateral wall at a first end of the support surface, a second upstanding lateral wall at a second end of the support surface, a front wall on a front side of the support surface, and a rear wall on a rear side of the support surface, wherein the first lateral wall, the second lateral wall, the front wall, and the rear wall are configured to secure the printer against lateral, fore, and aft forces experienced in the vehicle; and
- wherein at least a portion of the front wall extends to a lower height than a height of the first lateral wall and a height of a second lateral wall, the portion at least partially defining the unobstructed paper discharge space.

18. A printer station according to claim 17, wherein said printer is adapted to reside vertically adjacent the top of the front passenger seat entirely separate and independent of a padded vehicle headrest.

19. A printer station according to claim 17, wherein said printer support structure comprises a printer tray.

20. A printer station according to claim 17, wherein said printer support structure comprises a fastener adapted for releasably attaching to said printer.

* * * * *